United States Patent [19]

Lundquist

[11] Patent Number: 4,952,132
[45] Date of Patent: Aug. 28, 1990

[54] REVERSE-PURGING PLASTIC INJECTION NOZZLE

[75] Inventor: Lynn Lundquist, Portland, Oreg.

[73] Assignee: Nickerson Machinery Co., Accord, Mass.

[21] Appl. No.: 620,068

[22] Filed: Aug. 7, 1984

Related U.S. Application Data

[63] Continuation-in-part of Ser. No. 431,044, Sep. 30, 1982, abandoned.

[51] Int. Cl.$^5$ .............................................. B29B 17/02
[52] U.S. Cl. .................................... 425/197; 210/390; 210/411; 425/562
[58] Field of Search ............... 425/205, 227, 557, 560, 425/564, 568, 570, 562, 197, 225, 226, 561; 264/211, 169, 37, 39; 210/390, 411, 412, 798; 425/567

[56] References Cited

U.S. PATENT DOCUMENTS

| | | | |
|---|---|---|---|
| 805,237 | 11/1905 | Sears | 210/390 |
| 1,929,348 | 10/1933 | Cathcart | 239/110 |
| 3,495,299 | 2/1970 | Chazal et al. | 425/197 |
| 3,528,611 | 9/1970 | Watson | 239/119 |
| 4,056,474 | 11/1977 | Snouffer | 210/390 |
| 4,135,870 | 1/1979 | Wallace et al. | 425/205 |
| 4,416,605 | 11/1983 | Konno et al. | 425/197 |

FOREIGN PATENT DOCUMENTS

| | | | |
|---|---|---|---|
| 2844246 | 4/1980 | Fed. Rep. of Germany | 425/197 |
| 2848121 | 5/1980 | Fed. Rep. of Germany | 425/197 |
| 2947698 | 6/1981 | Fed. Rep. of Germany | 425/197 |
| 3011132 | 10/1981 | Fed. Rep. of Germany | 425/225 |

Primary Examiner—Jill L. Heitbrink

[57] ABSTRACT

A purgeable plastic injection filter nozzle for trapping and eliminating contaminants from molten plastic material in a plastic injection molding apparatus. A nozzle body has an internal main channel therethrough for flow of the molten plastic. A purging hole intersects the main channel and exits the side of the nozzle body. A rotatable housing is mounted in the nozzle body at the intersection of the main channel and the purging hole. A trap is mounted in the rotatable housing for trapping contaminants in the plastic. The housing is rotatable between a first position wherein the trap is in the flow of the molten plastic, and a second position wherein the trap may be purged of contaminants through the purging hole.

11 Claims, 3 Drawing Sheets

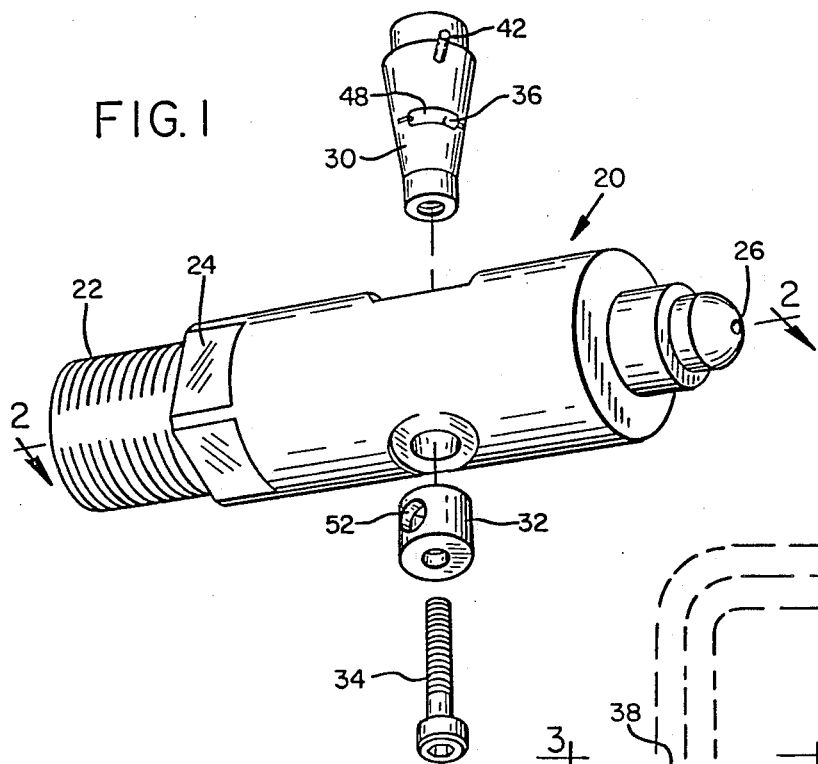
FIG.1
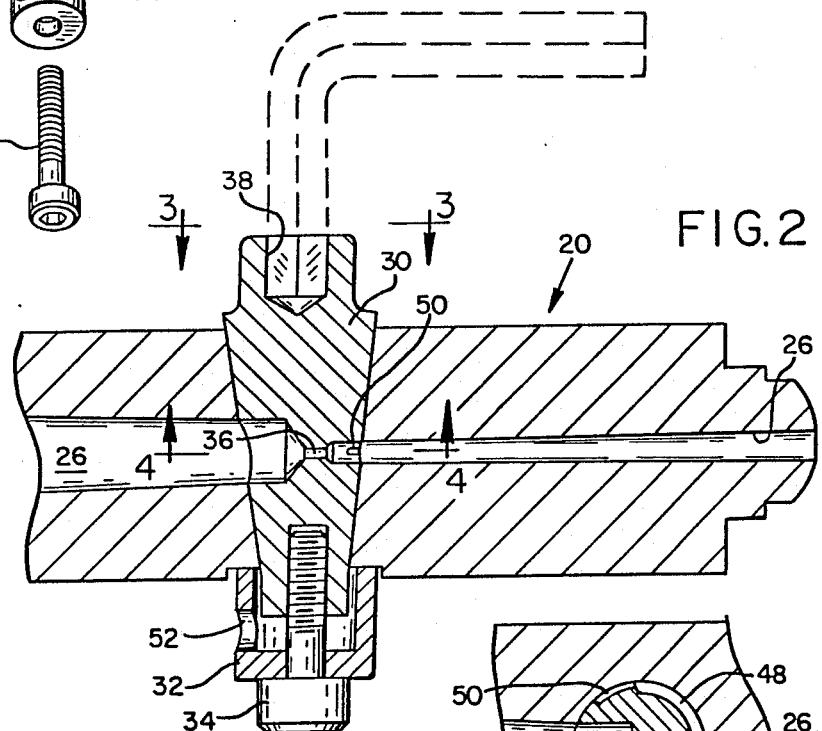
FIG.2
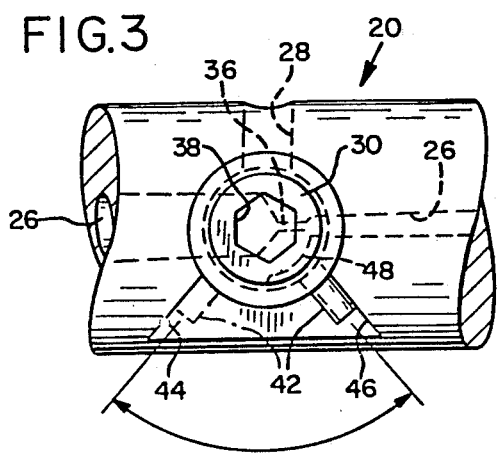
FIG.3
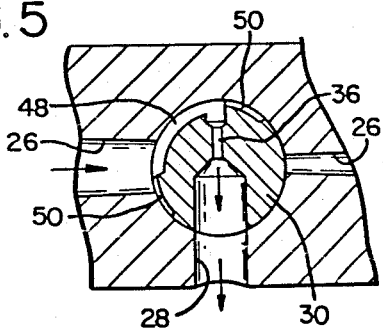
FIG.4
FIG.5

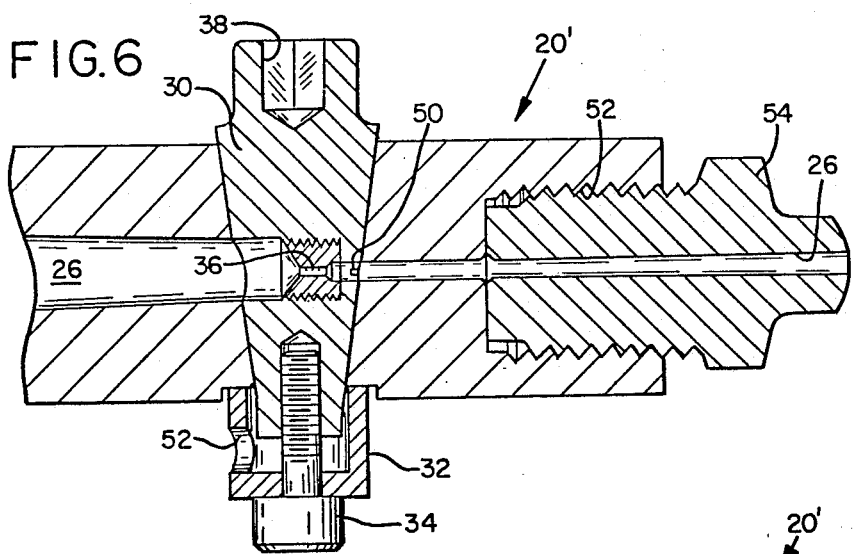
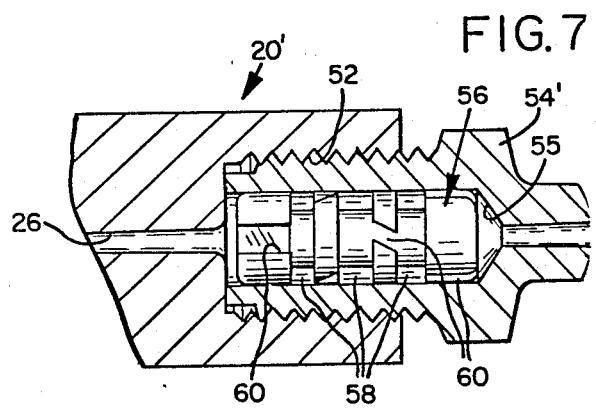
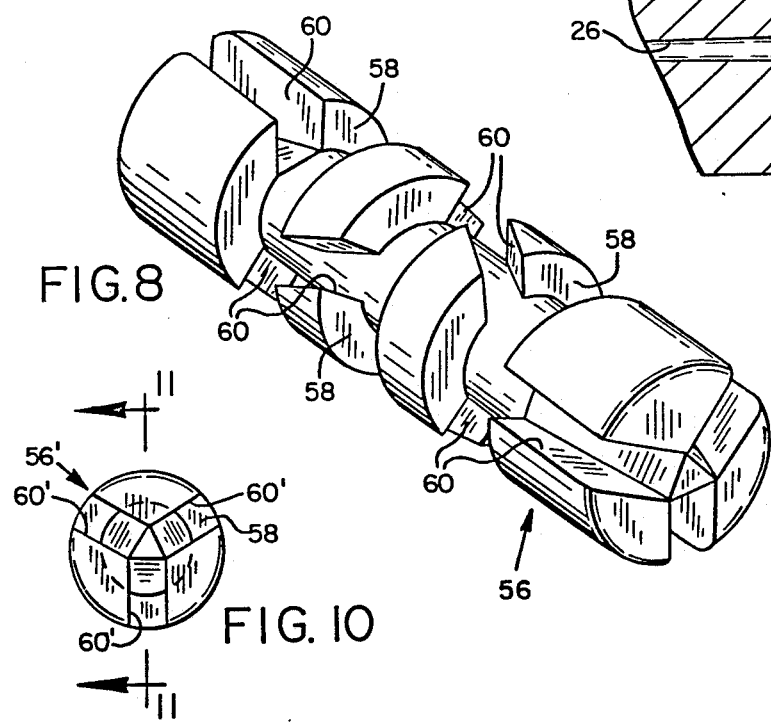
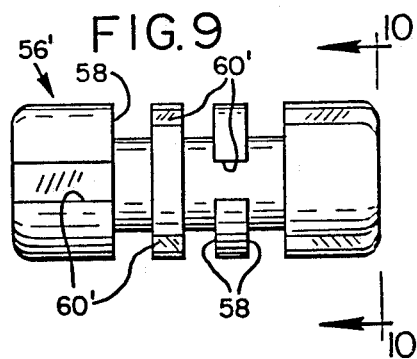
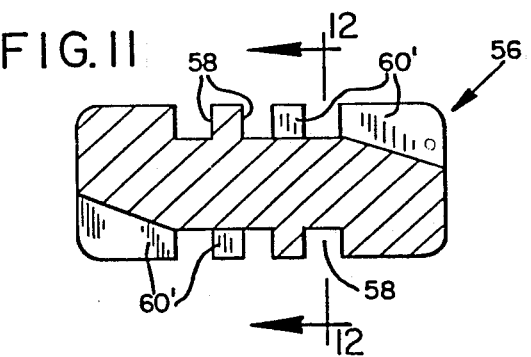
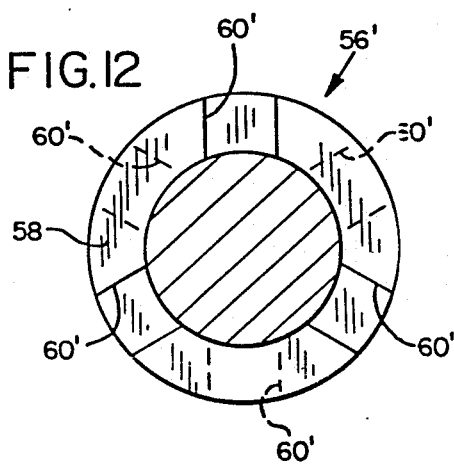

REVERSE-PURGING PLASTIC INJECTION NOZZLE

This application is a continuation-in-part of application Ser. No. 431,044, filed Sept. 30, 1982, now abandoned.

BACKGROUND OF THE INVENTION

This invention relates to plastic injection molding equipment, and in particular to a plastic injection nozzle having a trap which is easily purged of foreign contaminants.

In the plastic injection molding industry, regrind material is sometimes used for parts in which the external appearance or color is unimportant. Whenever such material is used for plastic injection molding, there is a risk of tramp metal or other contaminants lodging in the nozzle. This usually occurs in the tip area of the nozzle due to the restricted oriface size. The effect of a plugged nozzle is costly machine down time.

Previously, any time a nozzle became plugged, it was necessary to remove the nozzle for cleaning. At best, the removal of a nozzle is cumbersome because of the elevated temperatures, usually above 400° F., and the presence of melted plastic. Often, heater bands and monitoring equipment must be removed prior to removal of the nozzle. This operation is usually beyond the capability of the basic machine operator. Even for experienced maintenance personnel, the removal of a nozzle requires at least 30 minutes.

The prior art discloses removable nozzle tips which can be used in a nozzle body. If a removable nozzle tip is used, the cleaning operation may then be done in about 15 or 20 minutes. However, this is still a complicated operation since hot plastic is involved, and considerable time must be spent in carefully handling the parts to avoid burns.

As an alternative to frequent nozzle removal, metal trap adaptors have been developed. The metal trap uses a filter disk to trap contaminants. Typically this would be an enclosed metal disk of approximately 1.75 inches in diameter with a plurality of small diameter holes across the face. This trap will effectively stop metal before it reaches the tip. It will also hold more contaminants than would be possible in a conventional tip before flow is affected. Nonetheless, cleaning still involves the same objections as given above in that the hot metal trap must be disassembled for cleaning.

In any of the above assemblies, it must be realized that the fluctuating temperatures encountered during the time required for the cleaning operation causes degradation of the plastic in the barrel of the molding machine. Thus, additional time and material is lost and further cleaning may be required as a result.

The prior art further discloses a metal trap of the type having a multiplicity of small holes which can be cleaned by turning a gate to allow the metal contaminants to flow on through the nozzle. However, when the cleaning process is attempted, the nozzle tip is still subject to becoming plugged by the contaminants released from the trap. In both of the above filter trap designs having a multiplicity of holes it is possible that a gradual blockage of the filter may occur. Thus the operator might not initially be aware that problems exist. Partial blockage results in higher pressures in the molding machine. Further, the plastic's speed may be dramatically increased through the remaining holes, leading to momentarily excessive heating and degradation of the plastic.

Accordingly, it is the general object of the present invention to provide a plastic injection nozzle having a trap which is easily purged of contaminants through a purge hole in the nozzle body.

Another object is to provide a rotatable housing in which the trap is located, which is rotatable from a first position where the plastic material flows through normally, to a second position in which the trap is purged.

Another object is to provide a trap which is very quick to clean, resulting in low machine down time and little degradation of the plastic material.

Yet another object is to provide a simple trap, where it is readily apparent to the operator that contaminants are blocking the nozzle.

A further object is to provide a nozzle which is tightly sealed in normal operation.

Another object is to provide a nozzle which is easily and quickly cleaned by the basic machine operator.

Another object is to provide a nozzle which is safe to clean of contaminants.

A still further object is to provide a color mixing nozzle tip for mixing the molten plastic after it has passed through the trap area.

These and other objects and advantages of the present invention and the manner in which they are achieved will become apparent in the following specification and claims.

SUMMARY OF THE INVENTION

In its basic concept the present invention is a purgeable filter nozzle including a nozzle body having an internal main channel therethrough and a purging hole intersecting the main channel and exiting the side of the nozzle body. A rotatable housing is mounted in the nozzle body at the intersection of the main channel and the purging hole. Trap means is mounted in the rotatable housing for trapping contaminants in the plastic. The housing is rotatable between a first position wherein the trap means is in the flow of the molten plastic and a second position wherein the trap means may be purged of contaminants through the purging hole.

BRIEF DESCRIPTION OF THE DRAWINGS

FIG. 1 is an exploded bottom perspective view of the reverse-purging plastic injection nozzle of the present invention.

FIG. 2 is a fragmentary horizontal section taken along the line 2—2 of FIG. 1 showing the nozzle as assembled.

FIG. 3 is a fragmentary top view looking in the direction of arrows 3—3 of FIG. 2.

FIG. 4 is a fragmentary section taken along the line 4—4 of FIG. 2 showing the first or through-flow position of the rotatable housing.

FIG. 5 is a fragmentary section, similar to FIG. 4, showing the rotatable housing in its second or purging position.

FIG. 6 is a fragmentary horizontal section, similar to FIG. 2, showing a removable nozzle tip.

FIG. 7 is a fragmentary horizontal section, similar to FIG. 6, illustrating a color dispersion device within the removable tip.

FIG. 8 is a top perspective view of the color dispersion device in FIG. 7.

FIG. 9 is a top plan view of a second embodiment of the color dispersion device similar to the one shown in FIG. 8.

FIG. 10 is an end view of the color dispersion device of FIG. 9 looking in the direction of arrows 10—10 of FIG. 9.

FIG. 11 is a horizontal section taken along the lines 11—11 of FIG. 10.

FIG. 12 is a section taken along the lines 12—12 of FIG. 11.

DESCRIPTION OF THE PREFERRED EMBODIMENT

Figure 13:
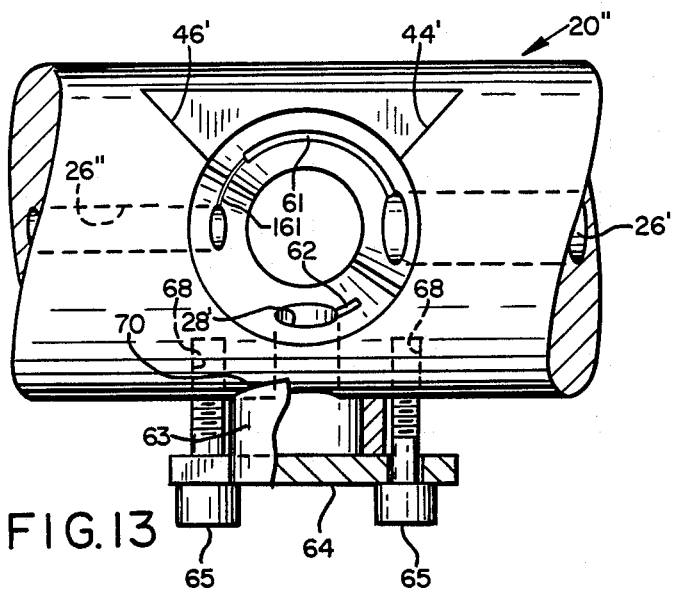
FIG. 13 is a top view of a third embodiment of the nozzle body of the present invention.

As shown in FIG. 1, the reverse-purging plastic injection nozzle of the present invention includes a nozzle body shown generally at 20. The exterior of the nozzle body is preferably configured as an elongated cylinder. The rear end of the nozzle body includes threads 22 for screwing the nozzle body to the injection molding machine. Flats 24 are provided on the nozzle body for gripping by a wrench. The forward end of the nozzle body defines the tip of the nozzle which is configured to abut an injection molding die.

FIG. 2 illustrates a main channel 26 extending centrally through nozzle body 20. In most applications the main channel will be large at the rear end of the nozzle body, tapering forwardly. This is simply to provide a smooth flow of plastic from the injection molding barrel through the nozzle.

In the forward end of nozzle body 20 the main channel 26 is illustrated as gradually increasing in diameter. This construction is to prevent clogging by an elongated particle which manages to get past the trap area.

FIG. 3 illustrates a purge hole 28 in nozzle body 20 intersecting main channel 26. Preferably the purge hole exits the nozzle body perpendicularly from the main channel.

It is at this intersection of the main channel and the purge hole that a trap is provided for trapping contaminants which may be in the plastic material.

As best shown in FIGS. 1 and 2 a rotatable housing is provided at the intersection of main channel 26 and purge hole 28. The rotatable housing preferably comprises a cone 30 which fits into a similarly configured conical hole in nozzle body 20.

The cone is fastened in the nozzle body by a cap 32 which abuts the nozzle body and covers the small end of the cone. A cap screw 34 engages the cone and is shouldered on the cap for cinching the cone into the nozzle body.

Trap means is mounted in the rotatable housing or cone 30 for trapping contaminants in the plastic. The trap means preferably comprises a restrictive member 36 having a hole therethrough smaller than any other section of the main channel. The restrictive member may be a portion of the cone 30, or may be a special insert, (FIG. 6), which inserts could have holes of various sizes and configurations for various applications. It will be understood the trap can be of any configuration or design so long as it performs the function of collecting contaminant particles.

A handle engagement means, preferably a hex socket 38 is provided in cone 30 for engagement by a handle means such as Allen wrench 40 as a handle for turning the cone.

The rotatable housing or cone 30 includes a locating pin 42 as best shown in FIG. 3. The nozzle body includes a machined section having stops 44 and 46 for abutment by the locating pin. The stops are configured to determine the limits of rotation of the cone.

FIGS. 4 and 5 best illustrate the through-flow and purging configurations or positions which the trap area is configured to assume.

FIG. 4 illustrates the first or through-flow position of trap 36. In this position plastic material flows through the trap and any contaminants in the plastic material which are larger than the trap size become lodged at the restriction.

It is to be noted that in comparing FIGS. 3 and 4 that locating pin 42 solidly abuts stop 46 when cap screw 34 is tightened. Thus, tightening the cap screw secures the cone in the through-flow position.

In FIG. 5 the second or purging position is illustrated. This is the position of the cone when locating pin 42 abuts stop 44. Cone 30 includes a bleed channel 48 which extends around the periphery of the cone. In this position molten plastic material is forced through the bleed channel to the normally downstream side of the trap 36. This causes a reverse pressure on any contaminants in the trap area. The contaminants are forced out purge hole 28.

In addition to bleed channel 48 a pressure release channel 50 communicates with the bleed channel and extends further around the periphery of the cone. This is to assure a continual outlet for the pressurized molten plastic material. Thus, the assembly is not in danger of rupturing should the cone member be accidently tightened in a position somewhere between its first or through-flow position and its second or purging position.

Cap screw 34 solidly secures cone 30 in nozzle body 20. In order to rotate the cone it is necessary to loosen the cap screw. In so doing a small amount of the molten plastic material may leak out ends of the cone member. Cap 32 includes a hole 32' through which this material can escape.

FIG. 6 illustrates a second embodiment of the nozzle body shown generally at 20'. The nozzle body includes a threaded, recessed hole 52 in line with main channel 26 and downstream from the rotatable housing or trap area 36. An interchangeable nozzle tip 54 is configured to screw into hole 52. The nozzle tip has a channel therethrough for passing the molten plastic. A very gradual increase in the diameter of the main channel downstream from the trap area is provided to make sure that a contaminant particle, perhaps elongated but having a cross section able to pass the trap, does not then turn and lodge in the main channel.

FIG. 7 illustrates a second embodiment of the interchangeable nozzle tip 54'. Nozzle tip 54' includes an enlarged hollow area 55 in line with main channel 26.

Located within this hollow is a color dispersion device 56 for mixing the molten plastic.

FIG. 8 illustrates in further detail the construction of the color dispersion device 56. It comprises a cylinder of the same diameter as hollow 55 in nozzle tip 54'. A plurality of circumferential grooves 58 are cut into the cylinder. Connecting channels 60 are cut between the grooves and to the ends of the cylinder for communicating the plastic material between grooves. These connecting channels may be cut on a slant as illustrated. This forms a tortuous channel through which the molten plastic must flow. The molten plastic repeatedly divides and recombines thus thoroughly mixing any coloring agents or other additives into the plastic prior to its injection into the mold.

FIGS. 9 and 12 illustrate a second embodiment of the color dispersion device 56'. In this embodiment the connecting channels 60' are cut straight rather than on an angle. This appears to be adequate for most applications. It will be noted that any number of circumferential grooves 58 and corresponding connecting channels 60 or 60' could be cut into the color dispersion device. However, the arrangement illustrated adequately achieves the intended purpose for most common applications.

In much molding there is no need for a mixing means such as the color dispersion device as herein disclosed. However, if a color dispersion device is required it is advantageous to locate it downstream from the trap so that it is protected from contaminants. Thus, the utility of the entire assembly as disclosed is readily apparent.

FIG. 13 is a fragmentary horizontal plan view of the third embodiment of the nozzle body 20". A conical hole is formed at the trap area of the nozzle body perpendicular to main channel 26' and purge hole 28'. The downstream end of the main channel is denoted by 26", and is of a smaller diameter than the upstream main channel.

Figure 14:
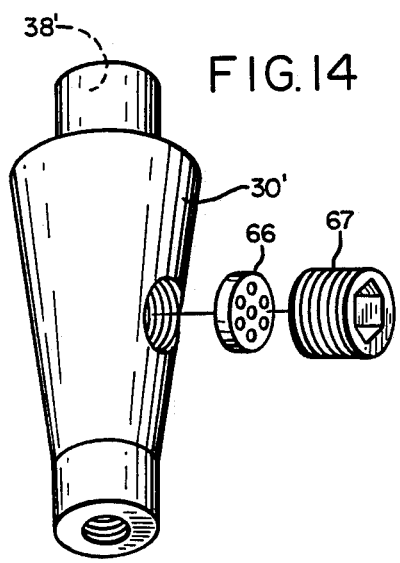
FIG. 14 is a bottom perspective view of the conical trap which mates with the nozzle body of FIG. 13.

FIG. 14 illustrates a rotatable housing or cone 30', which is configured to seat in the conical hole of nozzle body 20". The cone has a transverse hole therethrough in which is located the trap means. In this embodiment no bleed channel or pressure relief channel are formed in the cone.

FIG. 13 illustrates a bleed channel 61 and a pressure relief channel 62 notched into the conical mating surface of the nozzle body 20" in the plane of main channel 26' and purge hole 28'. A bypass channel 161 is also formed in nozzle body 20", as shown in FIGS. 13 and 15-17. This is a very tiny notch in comparison to bleed channel 61, and communicates between the bleed channel and the downstream end of main channel 26". The purpose of this is to allow a very small amount of plastic to flow through the bleed channel during normal operation. This continually exhausts the plastic in the bleed channel. Long term color contamination is prevented in those instances where a color change is made.

In both this and the previous embodiments the bleed channel and the pressure relief channel are at the interface between the nozzle body and the rotatable housing, although it is conceivable that they could be formed as drilled passages in the nozzle body or rotatable housing, communicating at the appropriate points with the trap area.

Figure 15:
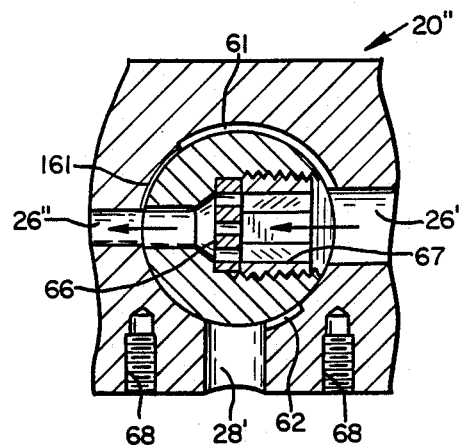
FIG. 15 is a fragmentary plan section of the third embodiment of the nozzle showing the first or through-flow position of the rotatable housing.
Figure 16:
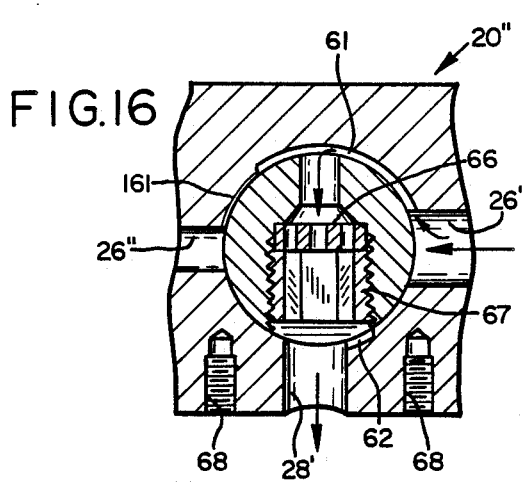
FIG. 16 is a fragmentary section, similar to FIG. 15, showing the rotatable housing in its second or purging position.
Figure 17:
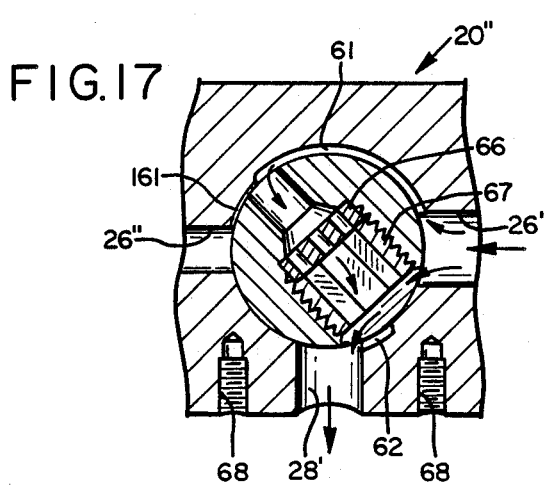
FIG. 17 is a fragmentary section, similar to FIG. 15, showing a third or intermediate position of the rotatable housing.

FIGS. 15, 16 and 17 schematically illustrate the function of this embodiment. FIG. 15 shows the through-flow position of the rotatable housing. In this position the trap can block any contaminant particles in the flow of plastic.

FIG. 16 illustrates the purging position of the rotatable housing. Plastic under pressure is forced from main channel 26' around bleed channel 61 and reversely through the trap area. Thus, contaminant particles are forced out purge hole 28'.

FIG. 17 illustrates that pressure relief channel 62 provides an escape for the molten plastic under pressure in all positions of the rotatable housing so that the cone cannot accidently be locked in a position to completely block the flow. Plastic flowing in the direction of the arrow serves to sweep away any contaminant particles.

Similarly to the previous embodiment, the rotatable housing or cone 30' is rotatable by hex socket 38' between two positions, 90° apart, denoted by stops 44' and 46'.

FIGS. 14 through 17 further illustrate a third embodiment of the trap means. A filter screen 66 having a number of small holes is configured to be seated in the trap area of cone 30' by a hollow set screw 67. It should be noted that the filter screen could have only one hole of any desired size, or may be formed with any number of smaller holes. Thus several contaminant particles may collect in the trap area before purging is required.

Figure 18:
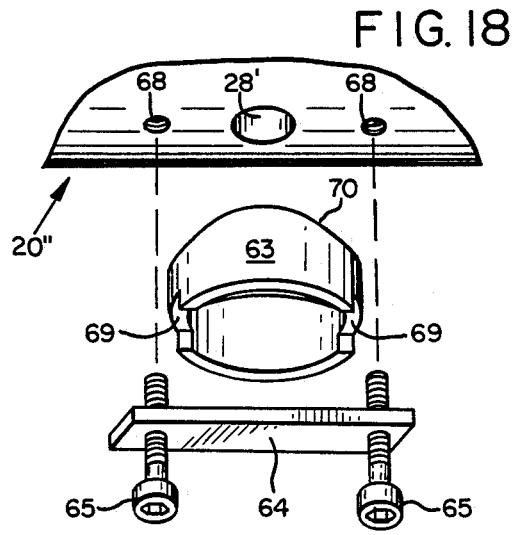
FIG. 18 is a fragmentary exploded top perspective view illustrating the purging shield assembly.

FIGS. 13 and 18 illustrate a purging shield which includes a cylindrical main shield 63 and a bar shield 64 which covers purge hole 28'. The shield assembly is attached to the nozzle body by two bolts 65 which engage threaded holes 68 in the nozzle body. The cylindrical main shield is contoured at 70 to mate with the corresponding surface of the nozzle body. It is further slotted at 69 so that the bar shield recesses into the cylindrical main shield.

Bar shield 64 covers purge hole 28' in such a way that all purged material must impinge on the bar shield and deflect to the open space between the bar shield and the inside surface of cylindrical main shield 63. In this way the velocity of the material exiting the purge hole is significantly reduced by the resultant tortuous path of travel.

OPERATION

The purpose of the reverse-purging nozzle of the present invention is to provide a means of clearing the nozzle of an obstruction without the necessity or time involvement required in removing the nozzle tip or the nozzle itself. This is accomplished by placing the smallest orifice diameter within the nozzle body so that when contaminants restrict the orifice it can be rotated to flush the contaminants out in the reverse direction. By rotating cone 30 from the through-flow position of FIG. 4 to the purging position of FIG. 5, full injection pressure may be placed on the contaminants in trap 36 through bleed channel 48.

Cone 30 is rotated by loosening locking cap screw 34 and rotating the cone with Allen wrench 40. At times core 30 may stick in nozzle body 20. However, to free the core cap screw 34 may be loosened and then tapped with a soft mallet. Upon the cone being rotated to the desired position the cap screw can then be retightened.

If the contaminants are difficult to remove the full injection pressure of the injection molding equipment can be applied against the contaminants. Usually, however, this is not the case and the contaminants can be easily removed by briefly switching to the purging position.

If severe contamination is a problem and the contaminants cannot be removed by rotating the cone to the purging position it is easy to completely remove the cone for cleaning and to flush the incoming main channel. This requires more time than the simple purging operation, but it is still considerably less time consuming than removing the tip or nozzle completely.

The primary advantage of the reverse-purging nozzle of the present invention is its ability to reduce machine down time when cleaning foreign materials from a contaminated nozzle. The actual manipulation time in reversing the cone from the normal flow position to the purging position and back takes well less than one minute. The only other use of time is in moving the injection molding machine plunger forward to complete the purging cycle if such is necessary. Depending on the molding machine being used and the operating conditions the entire cleaning operation can be done in little more than two minutes.

Manipulation of the reverse purging nozzle is also facilitated in that no hot parts are being handled or removed. No parts of the nozzle need to be touched by hand. Only the tools for engaging cap screw 34 and the hex socket 38 are required.

Further, heater bands are not required to be moved or shifted during the cleaning process.

Because the total down time is so drastically reduced, there is far less problems of plastic degrading in the barrel or the temperature fluctuation problem commonly encountered in the mold and heater elements.

Simplicity of function is also a significant advantage. A moderately capable operator could learn to clean the trap without the need of calling maintenance personnel for assistance.

Finally, the importance of each of these advantages is the significant reduction of total down time when a nozzle is fouled by foreign material. This time factor converts to an economic advantage not only in keeping a machine on line for more working hours, but it may allow a justifiable use of marginal material which would otherwise be unusable.

Having described my invention in its preferred embodiment, I claim:

1. A purgeable plastic injection filter nozzle for trapping and eliminating contaminants from molten plastic material in a plastic injection molding apparatus, the nozzle comprising:
   (a) a nozzle body having an internal main channel therethrough, said main channel having upstream and downstream ends, the nozzle body also having a purging hole intersecting the main channel and exiting the side of the nozzle body,
   (b) a rotatable housing mounted in the nozzle body at the intersection of the main channel and the purging hole,
   (c) a transverse bore through the rotatable housing having upstream and downstream end portions and an intermediate contaminants-blocking portion having a diameter smaller than the end portions and the main channel,
   (d) the housing being rotatable between a first position wherein the upstream and downstream end portions of the transverse bore are in communication with the upstream and downstream ends, respectively, of the main channel for flow of molten plastic material through the main channel, and a second position wherein the upstream end portion of the transverse bore is in communication with the purging hole and the downstream end portion of the transverse bore is in communication with the upstream end of the main channel, whereby contaminants collected in the upstream end portion of the transverse bore while the rotatable housing is in said first position are discharged through the purging hole by the pressure of molten plastic material in the upstream end of the main channel upon rotation of the rotatable housing to said second position,
   (e) a bleed channel disposed between the nozzle body and the rotatable housing operable to conduct molten plastic material under pressure from the upstream end of the main channel to the normally downstream end position of the transverse bore when the rotatable housing is in the said second position, thereby causing a reverse flow of molten plastic material through said transverse bore, and
   (f) a pressure relief channel between the nozzle body and the rotatable housing operable to communicate the upstream end of the main channel with the downstream end of the main channel or the purging hole when the rotatable housing is in a position intermediate said first and second positions, whereby to provide a continual outlet and pressure relief for molten plastic material under pressure in the upstream end of the main channel.

2. The purgeable filter nozzle of claim 1 wherein the rotatable housing comprises a cone, and wherein the nozzle body has a similarly configured and dimensioned conical hole therein for receiving and seating the cone.

3. The purgeable filter nozzle of claim 2 further comprising a cap covering the small end of the cone and abutting the nozzle body, and a cap screw engaging the cone and shouldered on the cap for cinching the cone into the nozzle body.

4. The purgeable filter nozzle of claim 3 wherein the cap has a hole therein for venting leaked plastic material.

5. The purgeable filter nozzle of claim 1 wherein the rotatable housing includes a locating pin, and wherein the nozzle body includes stops for abutment by the locating pin, the stops being configured to determine the limits of rotation between the first position and the second position.

6. The purgeable filter nozzle of claim 1 wherein the nozzle body includes a threaded, recessed hole in line with the main channel and downstream from the rotatable housing, and further comprising a nozzle tip configured to screw into said hole, the nozzle tip having a channel therethrough for passing the molten plastic.

7. The purgeable filter nozzle of claim 1 including a bypass channel communicating the downstream end of the bleed channel with the downstream end of the main channel downstream from the transverse bore for allowing a small flow of molten plastic material to exhaust the bleed channel during normal operation.

8. The purgeable filter nozzle of claim 1 including a filter screen secured in the upstream end portion of the transverse bore in the rotatable housing.

9. The purgeable filter nozzle of claim 8 wherein the filter screen includes a plurality of holes and a hollow set screw secures the screen in the upstream end portion of the transverse bore.

10. The purgeable filter nozzle of claim 1 including a purging shield at the exit of the purging hole from the nozzle body, the purging shield forming a tortuous path for purged material.

11. The purgeable filter nozzle of claim 10 wherein the purging shield comprises a hollow cylindrical main shield mating with the exterior of the nozzle body and centered on the axis of the purging hole, and a bar shield extending across and partially closing the end of the main shield and in line with the purging hole, against which purged material impinges.

* * * * *